US010377234B2

(12) United States Patent
Rolfes et al.

(10) Patent No.: US 10,377,234 B2
(45) Date of Patent: Aug. 13, 2019

(54) VEHICLE IGNITION SYSTEMS AND METHODS

(71) Applicant: Ford Global Technologies, LLC, Dearborn, MI (US)

(72) Inventors: Nathaniel Abram Rolfes, Detroit, MI (US); Steven R El Aile, Sterling Heights, MI (US); Mohamad Wajih Issam Farhat, Dearborn, MI (US); Kassem Moustafa, Southfield, MI (US); Domenic Miccinilli, Royal Oak, MI (US); Mauricio Alexander Munoz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/621,851

(22) Filed: Jun. 13, 2017

(65) Prior Publication Data

US 2018/0354363 A1 Dec. 13, 2018

(51) Int. Cl.

| | |
|---|---|
| ***B60K 28/04*** | (2006.01) |
| ***B60K 28/12*** | (2006.01) |
| ***B60R 25/04*** | (2013.01) |
| ***B60R 25/25*** | (2013.01) |
| ***B60R 25/24*** | (2013.01) |

(Continued)

(52) U.S. Cl.

CPC .............. *B60K 28/04* (2013.01); *B60K 28/12* (2013.01); *B60R 25/04* (2013.01); *B60R 25/24* (2013.01); *B60R 25/252* (2013.01); *B60K 2028/003* (2013.01); *G01L 19/0092* (2013.01); *G06K 9/0002* (2013.01); *G06K 9/00087* (2013.01); *G06K 9/00228* (2013.01); *G06K 9/00838* (2013.01); *G06K 9/6289* (2013.01)

(58) Field of Classification Search

CPC .. B60K 28/04; B60K 28/12; B60K 2028/003; B60R 25/24; B60R 25/252; B60R 25/04; G06K 9/6289; G06K 9/0002; G06K 9/00838; G06K 9/00087; G06K 9/00228; G01L 19/0092

USPC ........................................................... 701/99

See application file for complete search history.

(56) References Cited

U.S. PATENT DOCUMENTS

| | | |
|---|---|---|
| 6,400,835 B1 | 6/2002 | Lemelson et al. |
| 6,832,151 B2 | 12/2004 | Kumazaki et al. |

(Continued)

FOREIGN PATENT DOCUMENTS

| | | |
|---|---|---|
| DE | 102015009782 A1 | 1/2017 |
| EP | 1333174 A1 | 8/2003 |
| WO | WO 2016156525 A1 | 10/2016 |

OTHER PUBLICATIONS

Search Report dated Nov. 20, 2018 for GB Patent Application No. GB 1809606.5 (3 pages).

*Primary Examiner* — Brian P Sweeney

(74) *Attorney, Agent, or Firm* — Frank Lollo; Neal, Gerber & Eisenberg LLP; James P. Muraff

(57) ABSTRACT

Methods and systems are disclosed for activating a vehicle ignition system. An example vehicle includes an ignition system, a plurality of sensors, and a processor. The processor a processor is configured to determine, based on data received from the sensors, (i) that a person occupies a driver's seat of the vehicle, (ii) that a key fob corresponding to the vehicle is present, and (iii) that an input has been received at a shifter of the vehicle. The processor is also configured to responsively activate the ignition system.

16 Claims, 4 Drawing Sheets

(51) Int. Cl.

| | |
|---|---|
| *B60K 28/00* | (2006.01) |
| *G01L 19/00* | (2006.01) |
| *G06K 9/00* | (2006.01) |
| *G06K 9/62* | (2006.01) |

(56) References Cited

U.S. PATENT DOCUMENTS

| | | | |
|---|---|---|---|
| 8,308,607 B2 | 11/2012 | Christen et al. | |
| 2008/0167162 A1* | 7/2008 | Tomasson | B60R 25/04 477/99 |
| 2009/0018734 A1 | 1/2009 | Hayama et al. | |
| 2014/0114539 A1 | 4/2014 | Ando et al. | |
| 2015/0066238 A1* | 3/2015 | Todd | B60K 28/063 701/1 |

* cited by examiner

VEHICLE IGNITION SYSTEMS AND METHODS

TECHNICAL FIELD

The present disclosure generally relates to vehicle ignition systems and methods and, more specifically, automatic ignition based on one or more inputs.

BACKGROUND

A typical vehicle may have an engine and an ignition system configured to start the engine based on input from a user, such as a key being turned. Vehicles and vehicle manufactures may also put a premium on safety, convenience, and the driver's user experience, and as such may include one or more features to prevent the vehicle form being accidentally started.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments include systems and methods for automatically activating a vehicle ignition based on one or more inputs. An example disclosed vehicle includes an ignition system, a plurality of sensors, and a processor. The processor is configured to determine, based on data received from the sensors, (i) that a person occupies a driver's seat of the vehicle, (ii) that a key fob corresponding to the vehicle is present, and (iii) that an input has been received at a shifter of the vehicle. The processor is also configured to responsively activate the ignition system.

An example disclosed method includes receiving data from a plurality of sensors located in a vehicle. The method also includes determining, based on the data, (i) that a person occupies a driver's seat of the vehicle, (ii) that a key fob corresponding to the vehicle is present, and (iii) that an input has been received at a shifter of the vehicle. And the method further includes responsively activating an ignition system of the vehicle.

Another example may include means for receiving data from a plurality of sensors located in a vehicle. The example may also include means for determining, based on the data, (i) that a person occupies a driver's seat of the vehicle, (ii) that a key fob corresponding to the vehicle is present, and (iii) that an input has been received at a shifter of the vehicle. And the example may further include means for responsively activating an ignition system of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
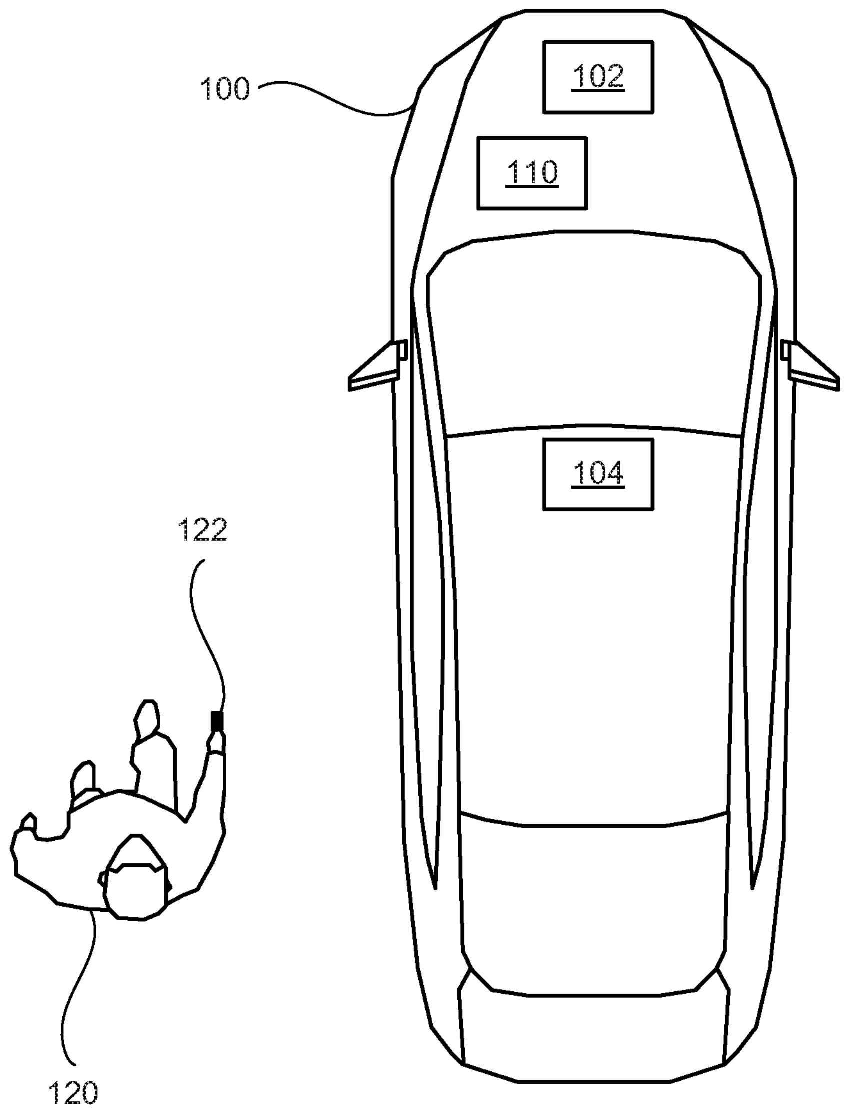
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles include mechanisms, devices, and systems for starting the vehicle. A typical system may require a driver to turn a key in an ignition lock, which may set off a series of events ending in the engine being started. Many systems also may require the driver to depress a brake pedal before the vehicle will start.

To provide a more natural, intuitive, and/or easy to use starting procedure, example embodiments disclosed herein may enable a driver to start a vehicle by using one or more inputs in lieu of or in addition to turning a key or depressing a brake pedal. The vehicle may include one or more sensors configured to detect the inputs from the driver, enabling the system to more easily determine a driver's intent to start the vehicle. Some embodiments may also provide safety features not available in a system that simply requires a key to be turned.

An example vehicle may include an ignition system, a plurality of sensors, and a processor. The plurality of sensors may include one or more pressure sensors, RF sensors, touch sensors, proximity sensors, cameras, latch sensors, magnetic sensors, and more. The sensors may be configured to detect one or more characteristics of the vehicle and/or a driver of the vehicle.

The processor may be configured to receive data from the plurality of sensors and make one or more determinations. The processor may determine that a person occupies the driver's seat, that a key fob is present in the vehicle, and that an input has been received at a shifter of the vehicle. The shifter input may be from the driver's hand touching the shifter.

FIG. 1 illustrates an example vehicle 100 and driver 120 according to embodiments of the present disclosure. Vehicle 100 may be a standard gasoline powered vehicle, a hybrid vehicle, an electric vehicle, a fuel cell vehicle, and/or any other mobility implement type of vehicle. Vehicle 100 may include parts related to mobility, such as a powertrain with an engine, a transmission, a suspension, a driveshaft, and/or wheels, etc. Vehicle 100 may be non-autonomous, semi-autonomous (e.g., some routine motive functions controlled by the vehicle 100), or autonomous (e.g., motive functions are controlled by vehicle 100 without direct driver input).

In the illustrated example, vehicle 100 includes an ignition system 102, a plurality of sensors 104, and a processor 110. Vehicle 100 may also include one or more components described below with respect to FIG. 2. The ignition system may be communicatively coupled to the plurality of sensors 104 and/or the processor 110, and may be configured to start the engine in response to a received command.

The plurality of sensors may be located inside or outside vehicle 100, and may be positioned at various places with respect to the driver's seat of the vehicle. The sensors will be described in further detail below with respect to FIG. 3.

Processor 110 may be configured to receive data input from the plurality of sensors, and make one or more determinations. For instance, processor 110 may determine that a driver, such as driver 120, is present in the driver's seat of vehicle 100. This may be determined based on data received from a pressure sensor in the driver's seat, based on one or more images received from a camera aimed at the driver's seat, or based on data received from one or more other sensors. In some examples, the processor may determine that a driver is present in the driver's seat based on a combination of data received from two or more sensors.

Processor 110 may also be configured to determine based on the data received from the plurality of sensors that a key fob corresponding to vehicle 100, such as key fob 122, is present. The plurality of sensors may include a radio frequency (RF) sensor, Bluetooth sensor, or other sensor configured to transmit to and/or receive data from a remote keyless entry device such as key fob 122.

In some examples, the plurality of sensors may include two or more RF sensors, Bluetooth sensors, or other such sensors that may be used to determine a location of the key fob. The sensors may be positioned inside vehicle 100 such that data from the sensors can be analyzed by processor 110 to determine a location of key fob 122 inside or outside vehicle 100. The location determination may include received signal strength (RSS) values, signal triangulation, or one or more other techniques.

Processor 110 may also be configured to determine that an input has been received at a shifter of the vehicle. The input may include a driver's hand touching the shifter. In some examples, vehicle 100 may include a touch sensor on the shifter, configured to detect when a hand is present. The touch sensor may also be configured to detect a fingerprint, and may enable processor 110 to differentiate between approved drivers and unapproved drivers based on the received fingerprint.

In some examples, processor 110 may also be configured to determine that one or more doors of vehicle 100 are closed and that a driver's seat belt is buckled. Responsive to the processor determinations, the processor may activate the ignition system.

Figure 2:
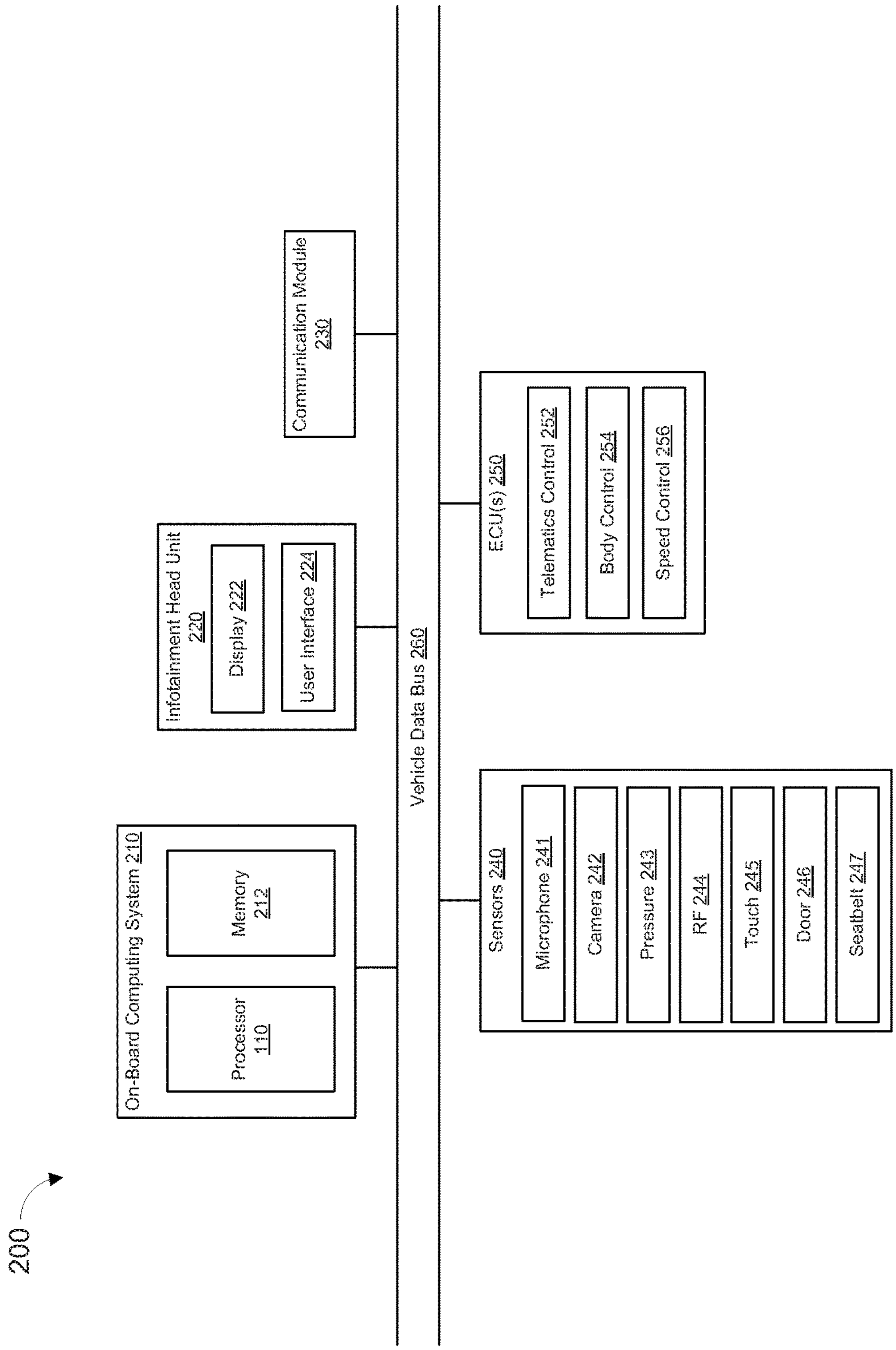
FIG. 2 illustrates a simplified block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 210, infotainment head unit 220, communications module 230, sensors 240, electronic control unit(s) 250, and vehicle data bus 260.

The on-board computing system 210 may include a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 210. Additionally, the infotainment head unit 220 may display the infotainment system on, for example, a center console display of vehicle 100.

Communication module 230 may include wired or wireless network interfaces to enable communication with external networks, devices, or systems. Communications module 230 may also includes hardware (e.g., processors, memory, storage, antenna, etc.) and software to control the wired or wireless network interfaces. In the illustrated example, communications module 230 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, communications module 230 may include a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

Sensors 240 may be arranged in and around vehicle 100 to monitor properties of vehicle 100 and/or an environment in which the vehicle 100 is located. Further, sensors 240 may monitor one or more properties or characteristics of a driver of vehicle 100. One or more of sensors 240 may be mounted on the outside of vehicle 100 to measure properties around an exterior of the vehicle 100. For instance, one or more antennas may be positions around an outside of vehicle 100 in order to receive signals from one or more devices and to determine a location of the device. Additionally or alternatively, one or more of sensors 240 may be mounted inside a cabin of vehicle 100 or in a body of vehicle 100 (e.g., an engine compartment, wheel wells, etc.) to measure properties in an interior of the vehicle 100. For example, sensors 240 may include accelerometers, odometers, tachometers, pitch and yaw sensors, wheel speed sensors, microphones, tire pressure sensors, biometric sensors and/or sensors of any other suitable type.

In some examples, sensors 240 may include one or more microphones 241, cameras, 242, pressure sensors 243, RF sensors 244, touch sensors 245, door sensors 246, and/or seatbelt sensors 247. These sensors are described in further detail below with respect to FIG. 3.

The ECUs 250 may monitor and control subsystems of vehicle 100. Additionally, ECUs 250 may communicate properties (such as, status of the ECU 250, sensor readings, control state, error and diagnostic codes, etc.) to and/or receive requests from other ECUs 250, on-board computing platform 210, and/or processor 110. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors 130. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the on-board computing system 210, infotainment head unit 220, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
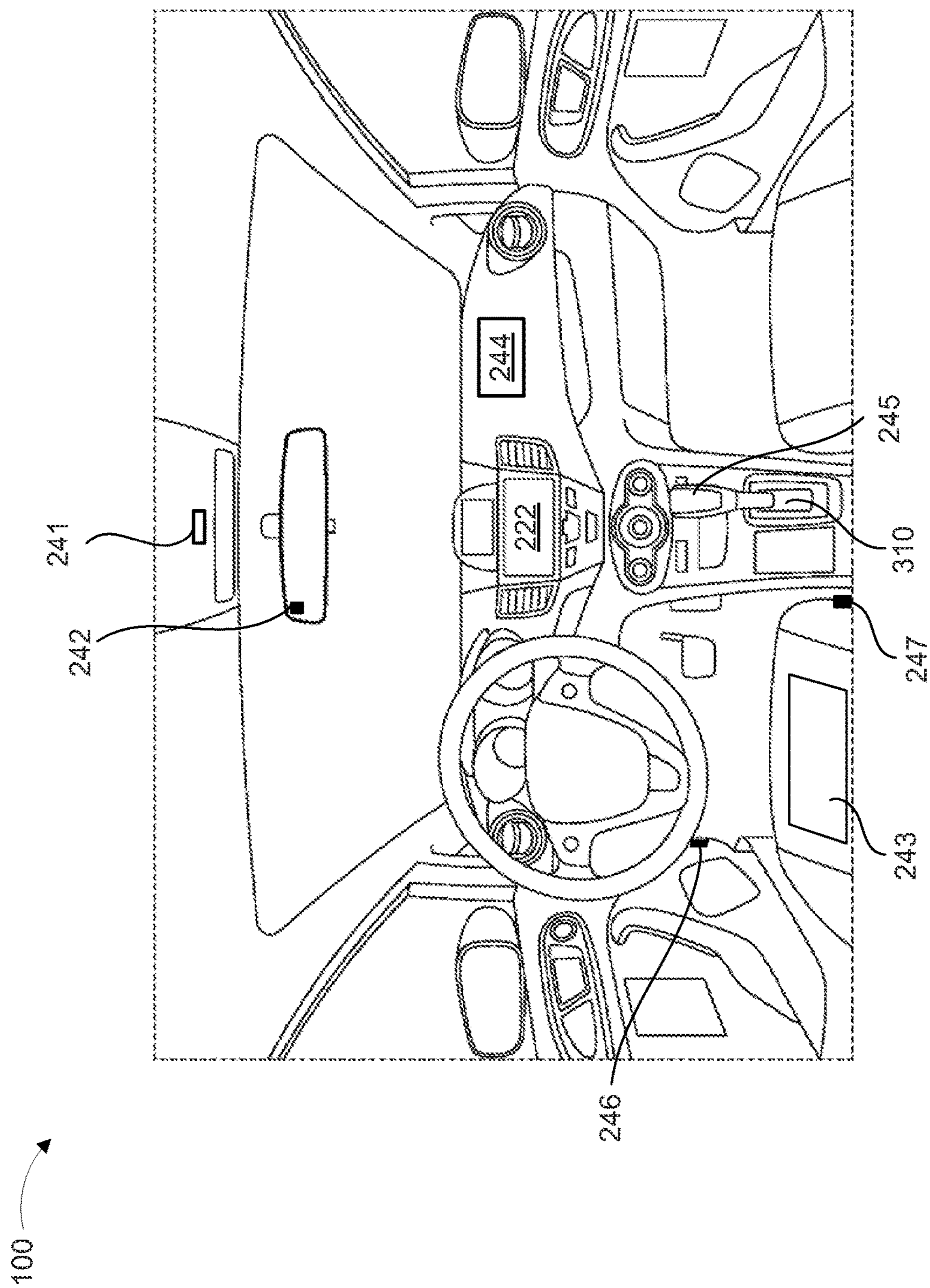
FIG. 3 illustrates a perspective view inside the vehicle of FIG. 1.

FIG. 3 illustrates a perspective view of vehicle 100 from inside, showing a plurality of sensors 241-247 and example locations inside the cabin of vehicle 100.

Microphone 241 may be configured to receive voice data from a driver of vehicle 100. The voice data may be processed and used to control one or more aspects of vehicle 100. In some examples, voice data received by microphone 241 may be used to authenticate a driver, via voice recognition or through the input of a password or pass code. In FIG. 3, microphone 241 is shown on a center portion inside the roof of vehicle 100, but in other examples the microphone may be located in a center console, dashboard, door, or other component of vehicle 100.

Camera 242 may be positioned in a rearview mirror of vehicle 100, and may be configured to capture one or more images of a person sitting in a driver's seat of vehicle 100. In some examples, the processor may be configured to determine whether or not a person is present in the driver's seat at all. This may be a threshold determination before the vehicle ignition system can be activated.

In some examples, the processor may be configured determine whether a person in an image captured by camera 242 is an authorized user of vehicle 100. This may include performing facial recognition on the image, to detect one or more features of the person. The processor may then compare to a stored image, and/or stored account corresponding to an authorized driver. The processor may then determine that a person is present in the driver's seat if there is a match, and if the driver in the image captured by camera 242 is authorized.

Camera 242 is shown in FIG. 3 as being located on the rearview mirror of vehicle 100, but it should be noted that one or more other positions can be used as well, provided the position enables camera 242 to view the driver's seat of vehicle 100.

Pressure sensor 243 may be located in and/or integrated with the driver's seat of vehicle 100. Data from pressure sensor 243 may be used by a the processor to determine that a person is present in the driver's seat.

RF sensors 244 may be located in one or more locations throughout the inside and/or outside of vehicle 100. The RF sensors may be configured to transmit and receive data with a key fob, such as key fob 122, and/or one or more other remote keyless entry devices. In some examples, RF sensors 244 may also be configured to determine a location of the key fob. For instance, RF sensors may be able to detect whether the key fob is within a particular distance or threshold range from vehicle 100 and/or a driver's seat of vehicle 100. It may be beneficial to activate the ignition system only when the key fob is in close proximity to the driver's seat. The threshold rage may thus be as small as within 1 or more inches, up to several feet or more.

RF sensors 244 and/or the processor may be further configured to perform authentication with the key fob. In this manner, a driver with an unauthorized key fob may not be able to activate the ignition.

Vehicle 100 may also include a shifter 310 with a touch sensor 245. Touch sensor 245 may be capacitive, inductive, or any other type of touch sensor, and may be configured to detect an input at the shifter, such as from a driver touching the shifter with his or her hand. In some examples, the processor may be configured to activate the ignition system based on detection of a person's hand on the shifter. But in other examples, touch sensor 245 and/or the processor may be configured to detect one or more fingerprints using touch sensor 245. In these examples the touch sensor 245 may be referred to as a fingerprint sensor. A fingerprint input may be processed and compared to one or more stored fingerprints and/or authorized accounts. Vehicle 100 may store one or more fingerprints and/or authorized accounts with which to compare a fingerprint input via touch sensor 245. Where the fingerprint corresponds to an authorized driver or authorized account, the processor may activate the ignition system.

FIG. 3 illustrates the touch sensor 245 located on a top portion of the shifter 310. However it should be noted that other positions and locations are contemplated as well, including on the center console, dashboard, instrument panel, and more.

Door sensor 246 may be configured to determine whether a door of vehicle 100 is closed or open. As such, door sensor 246 may include one or more magnetic, optical, electronic, or other components. In some examples, vehicle 100 may include a plurality of door sensors 246 configured to determine when each door of vehicle 100 is open or closed. Seat belt sensor 247 may be configured to determine when a seat belt of vehicle 100 is buckled or unbuckled.

Based on data from one or more of the sensors described herein, the processor may responsively activate the vehicle ignition system. And further, the processor may refrain from activating the ignition system in response to or based on data received from one or more sensors. For instance, where the facial recognition determines a person in the driver's seat is unauthorized, the ignition system may be locked. Further, where a driver's seat belt is unbuckled, the ignition system may similarly be locked. Other examples are possible as well.

One or more of the features and actions described herein may include communication with a server via the communications module 230. For instance, the facial recognition, authorization, and/or authentication actions described above may include communicating with a central server, which may store one or more accounts, images, codes, or other data.

Figure 4:
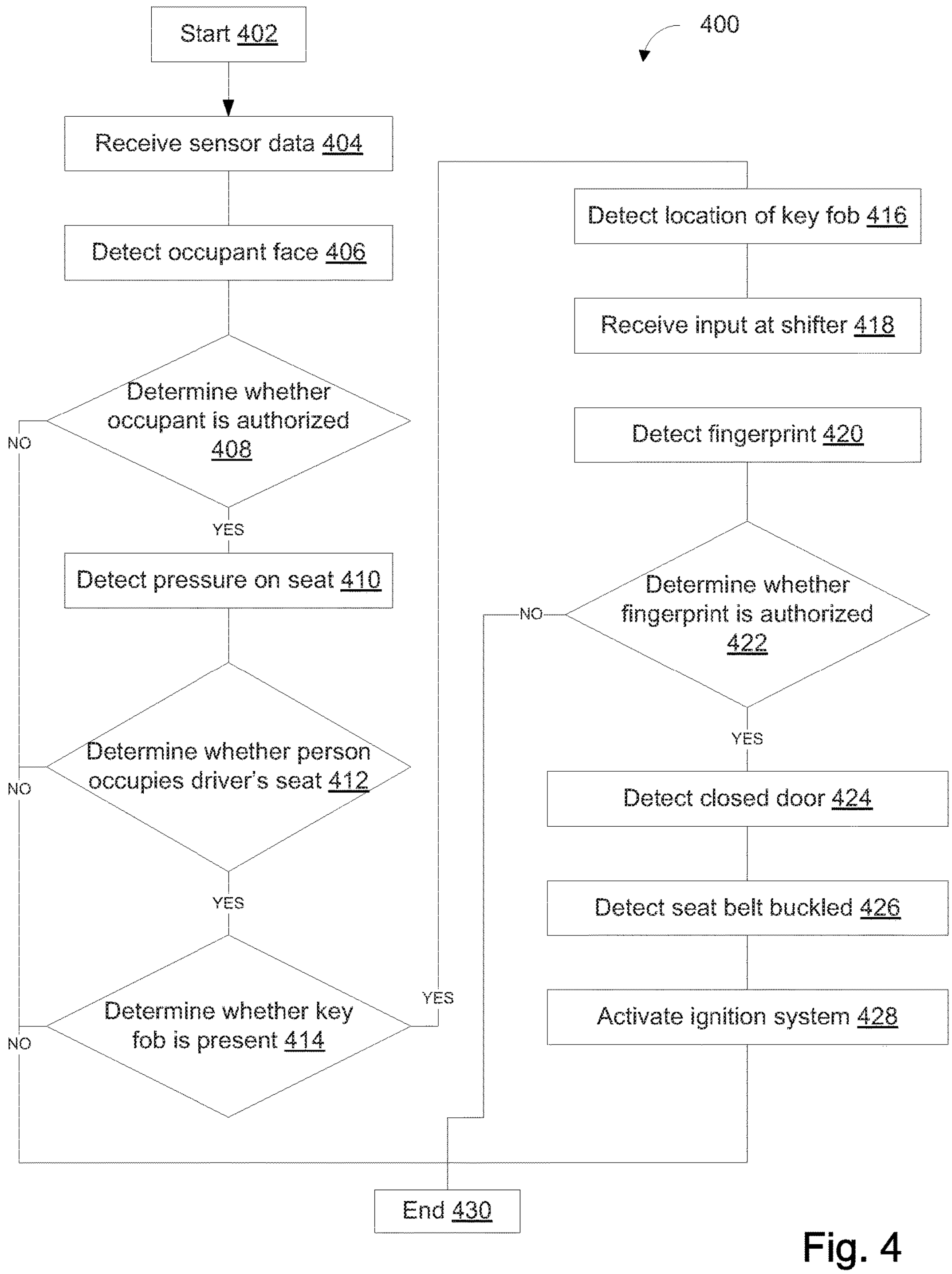
FIG. 4 illustrates a flowchart of an example method according to embodiments of the present disclosure

FIG. 4 illustrates a flowchart of an example method 400 according to embodiments of the present disclosure. Method 400 may enable a vehicle to activate the ignition system based on one or more inputs from a driver received by one or more vehicle sensors. The flowchart of FIG. 4 is representative of machine readable instructions that are stored in memory (such as memory 212) and may include one or more programs which, when executed by a processor (such as processor 110) may cause vehicle 100 to carry out one or more functions described herein. While the example program is described with reference to the flowchart illustrated in FIG. 4, many other methods for carrying out the functions described herein may alternatively be used. For example, the order of execution of the blocks may be rearranged, blocks may be changed, eliminated, and/or combined to perform method 400. Further, because method 400 is disclosed in connection with the components of FIGS. 1-3, some functions of those components will not be described in detail below.

Method 400 may begin at block 402. At block 404, method 400 may include receiving sensor data. This may include receiving sensor data from the various sensors described herein, such as microphones, cameras, pressure sensors, etc.

At block 406, method 400 may include detecting an occupant face. A camera may be positioned inside the vehicle aimed at a face of an occupant, and one or more images captured by the camera may be processed and analyzed to detect a face. Block 408 may then include determining whether the occupant is authorized to drive the vehicle. This may include determining one or more identities or accounts associated with the vehicle that are authorized, and comparing to the detected occupant face. If the occupant is not authorized, method 400 may end.

If the occupant is authorized, method 400 may include detecting a pressure on a driver's seat at block 410. Method 400 may then include determining whether a person occupies the driver's seat. In some examples, this may be done by analyzing data from a plurality of sensors. For instance, an object may be placed on the driver's seat, causing a pressure sensor to detect the weight. However, if the object is not a person, the camera may recognize that a person is not sitting in the seat. Instead, the combination of data from the camera and the pressure sensor may indicate that an object is present rather than a person. The combination of data may assist the vehicle in avoiding false positive determinations, and may provide additional safety.

At block 414, method 400 may include determining whether a key fob is present. This may include determining a location of the key fob, such as whether the key fob is inside or outside the vehicle, or within a threshold distance from the driver's seat. Block 416 may include determining the key fob location. This may be done using data from one or more RF sensors, or other sensors that transmit and/or receive data with the key fob.

At block 418, method 400 may include receiving input at the shifter. This input may be from a hand of a driver of the vehicle. In some examples, the shifter may include a pressure sensor, proximity sensor, or other sensor configured to detect an input. In this manner a driver wearing gloves may touch the shifter and the input may still be detected.

At block 420, method 400 may include detecting a fingerprint. Block 422 may include determining whether the fingerprint corresponds to an authorized account or identity. If the fingerprint is not authorized, method 400 may end. But if the fingerprint is authorized, method 400 may include detecting a closed door at block 424 and detecting a seat belt buckled at block 426. Then, responsive to the one or more determinations and based on the sensor data, method 400 may include activating the vehicle ignition system at block 428. Method 400 may then end at block 430.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:

an ignition system;

a plurality of sensors; and a processor configured to:

determine, based on data received from the sensors, (i) that a person occupies a driver's seat of the vehicle, (ii) that a key fob corresponding to the vehicle is present, (iii) that an input has been received at a shifter of the vehicle, and (iv) that at least one vehicle door is closed; and responsively activate the ignition system.

2. The vehicle of claim 1, wherein the plurality of sensors comprise a pressure sensor configured to detect whether a person occupies the driver's seat of the vehicle, a radio frequency (RF) sensor configured to detect the presence of the key fob, and a touch sensor configured to detect an input received at the shifter of the vehicle.

3. The vehicle of claim 1, wherein the plurality of sensors comprises a pressure sensor integrated with a the driver's seat, and wherein the processor is further configured to determine that a person occupies the driver's seat of the vehicle based on the pressure sensor.

4. The vehicle of claim 1, wherein the plurality of sensors comprises a camera configured to capture an image of a person sitting in the driver's seat, and wherein the processor is further configured to:

receive an image of a person sitting in the driver's seat;

determine, based on facial recognition performed on the image, that the person corresponds to an account of an authorized driver of the vehicle; and responsively activate the ignition system.

5. The vehicle of claim 1, wherein the plurality of sensors comprises one or more radio frequency (RF) sensors configured to detect the location of the key fob, and wherein the processor is further configured to:

determine that the key fob is located within a threshold range of the driver's seat; and responsively determine that the key fob corresponding to the vehicle is present.

6. The vehicle of claim 1, wherein the plurality of sensors comprises a fingerprint sensor integrated with the shifter of the vehicle, and wherein the processor is further configured to detect a fingerprint input via the shifter.

7. The vehicle of claim 6, wherein the processor is further configured to:

determine that the fingerprint corresponds to an account of an authorized driver of the vehicle stored in a database; and responsively activate the ignition system.

8. The vehicle of claim 1, wherein the processor is further configured to:

determine that a seat belt of the driver is buckled; and responsively activate the ignition system.

9. A method comprising:

receiving data from a plurality of sensors located in a vehicle;

determining, based on the data, (i) that a person occupies a driver's seat of the vehicle, (ii) that a key fob corresponding to the vehicle is present, (iii) that an input has been received at a shifter of the vehicle, and (iv) that at least one vehicle door is closed; and responsively activating an ignition system of the vehicle.

10. The method of claim 9, wherein the plurality of sensors comprise a pressure sensor configured to detect whether a person occupies the driver's seat of the vehicle, a radio frequency (RF) sensor configured to detect the presence of the key fob, and a touch sensor configured to detect an input received at the shifter of the vehicle.

11. The method of claim 9, wherein the plurality of sensors comprises a pressure sensor integrated with the driver's seat, the method further comprising determining that the person occupies the driver's seat of the vehicle based on the pressure sensor.

12. The method of claim 9, wherein the plurality of sensors comprises a camera configured to capture an image of a person sitting in the driver's seat, the method further comprising:

receiving an image of a person sitting in the driver's seat;

determining, based on facial recognition performed on the image, that the person corresponds to an account of an authorized driver of the vehicle; and responsively activating the ignition system of the vehicle.

13. The method of claim 9, wherein the plurality of sensors comprises one or more radio frequency (RF) sensors configured to detect the location of the key fob, the method further comprising:

determining that the key fob is located within a threshold range of the driver's seat; and responsively determining that the key fob corresponding to the vehicle is present.

14. The method of claim 9, wherein the plurality of sensors comprises a fingerprint sensor integrated with the shifter of the vehicle, the method further comprising detecting a fingerprint input via the shifter.

15. The method of claim 14, further comprising:

determining that the fingerprint corresponds to an account of an authorized driver of the vehicle stored in a database; and responsively activating the ignition system of the vehicle.

16. The method of claim 9, further comprising:

determining that a seat belt of the driver is buckled; and responsively activating the ignition system of the vehicle.

* * * * *